United States Patent
Hirukawa

(10) Patent No.: US 10,792,734 B2
(45) Date of Patent: Oct. 6, 2020

(54) CUTTING TOOL FOR BACK TURNING

(71) Applicant: TUNGALOY CORPORATION, Fukushima (JP)

(72) Inventor: Ryo Hirukawa, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 113 days.

(21) Appl. No.: 16/198,202

(22) Filed: Nov. 21, 2018

(65) Prior Publication Data

US 2019/0176239 A1 Jun. 13, 2019

(30) Foreign Application Priority Data

Dec. 13, 2017 (JP) .................... 2017-238954

(51) Int. Cl.
  *B23B 27/14* (2006.01)
  *B23B 27/04* (2006.01)
  *B23B 27/16* (2006.01)

(52) U.S. Cl.
  CPC .......... *B23B 27/145* (2013.01); *B23B 27/045* (2013.01); *B23B 27/141* (2013.01); *B23B 27/1614* (2013.01); *B23B 2200/087* (2013.01); *B23B 2200/321* (2013.01); *B23B 2200/369* (2013.01)

(58) Field of Classification Search
  CPC ... B23B 27/145; B23B 27/045; B23B 27/141; B23B 27/143; B23B 2200/087; B23B 2200/369; B23B 2200/0423; B23B 2200/0447; B23C 5/207; B23C 5/12; B23C 2210/205; B23C 2200/0433; B23C 2200/201
  See application file for complete search history.

(56) References Cited

U.S. PATENT DOCUMENTS

| | | | | |
|---|---|---|---|---|
| 3,557,416 A * | 1/1971 | Jones | .............. | B23B 27/143 407/114 |
| 4,685,844 A | 8/1987 | McCreery et al. | | |
| 4,840,518 A * | 6/1989 | Plutschuck | .......... | B23B 27/145 407/113 |
| 5,876,160 A * | 3/1999 | Johnson | ............ | B23C 5/202 407/113 |
| 6,595,092 B1 * | 7/2003 | Taniguchi | ........... | B23B 27/06 407/114 |
| 2004/0091329 A1 * | 5/2004 | Chang | ................ | B23B 27/145 408/233 |
| 2007/0059111 A1 * | 3/2007 | Deitert | ................ | B23C 5/207 407/113 |
| 2009/0279962 A1 * | 11/2009 | Dufour | ................ | B23C 5/207 407/37 |

(Continued)

FOREIGN PATENT DOCUMENTS

| | | |
|---|---|---|
| JP | H02-145907 U | 12/1990 |
| WO | 2015/129836 A1 | 9/2015 |

*Primary Examiner* — Nicole N Ramos
(74) *Attorney, Agent, or Firm* — Studebaker & Brackett PC

(57) ABSTRACT

Provided is a cutting tool for back turning capable of improving chipping resistance. A cutting tool wherein a wall surface of a chip breaker includes a first wall surface that is formed along a first ridgeline, and a reinforcing surface that is connected to the first wall surface and a first end surface at an end portion of the chip breaker on the side of a first cutting edge, and that forms an angle of 90 degrees or an obtuse angle with the first end surface.

5 Claims, 4 Drawing Sheets

(56) References Cited

U.S. PATENT DOCUMENTS

| | | | |
|---|---|---|---|
| 2011/0044776 A1* | 2/2011 | Ishi | B23B 51/048 408/1 BD |
| 2013/0149057 A1* | 6/2013 | Nisikawa | B23B 51/048 408/83 |
| 2013/0177360 A1* | 7/2013 | Hecht | B23C 5/207 407/113 |
| 2014/0199128 A1* | 7/2014 | Hecht | B23B 27/1651 407/103 |
| 2017/0066060 A1 | 3/2017 | Tsuda | |
| 2019/0176241 A1* | 6/2019 | Hirukawa | B23B 27/045 |

\* cited by examiner

Fig. 2A
Fig. 2B
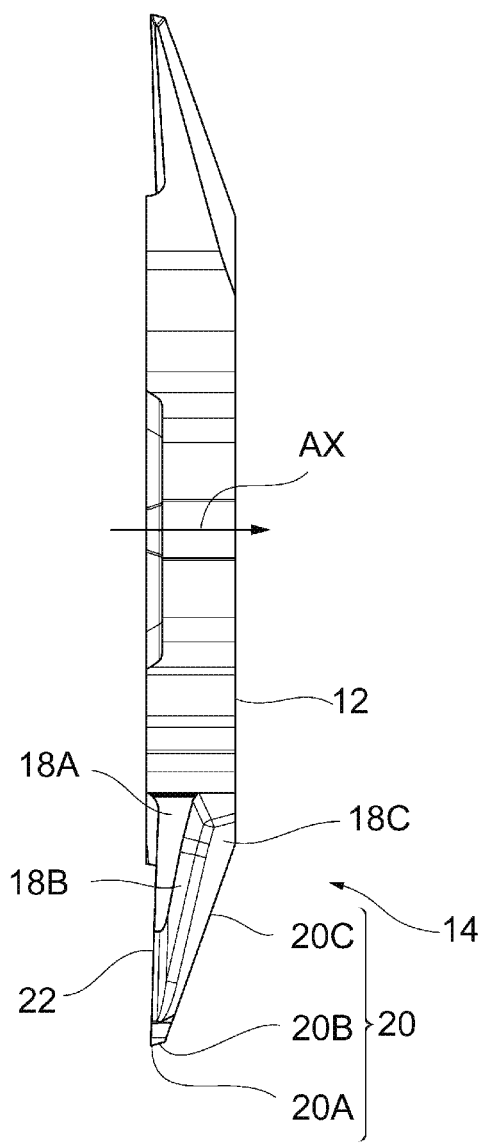
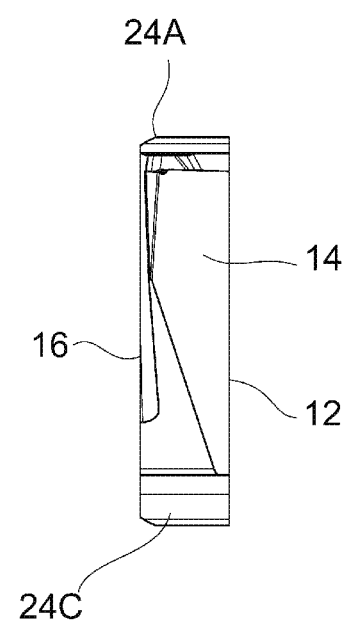

US 10,792,734 B2

CUTTING TOOL FOR BACK TURNING

BACKGROUND

Field

The present invention relates to a cutting tool for back turning.

Description of Related Art

WO 2015/129836 discloses a cutting tool capable of smoothly discharging chips in back turning. Specifically, WO 2015/129836 describes a cutting tool (1) in which an opening angle (θ1) of, among wall surfaces of a breaker groove (15), a front wall surface (21) opposing a front cutting edge (13) is greater than an opening angle (θ2) of a lateral wall surface (22) opposing a lateral cutting edge (14).

SUMMARY

However, a situation in which chips, which are generated when the cutting tool for back turning is moved perpendicularly to the rotational axis of a workpiece material and back turning is started, come into contact with and damage the terminal end portion of a chip breaker has been observed by the inventors. In addition, it has been found that, in the case where the wall surface of the chip breaker is sharply pointed at the terminal end portion, breaks and chipping caused by the collision of the chips tend to occur.

To cope with this, an object of the present invention is to provide a cutting tool for back turning capable of improving chipping resistance.

A cutting tool for back turning according to an aspect of the present invention is a cutting tool for back turning including: a flank facing a first direction; a first end surface connected to the flank, the first end surface facing a direction opposite to the first direction; an upper surface connecting the flank and the first end surface; a first ridgeline connecting the flank and the upper surface such that an angle formed with the first direction increases as a distance from the first end surface increases when viewed from a side of the upper surface; a second ridgeline connecting the first end surface and the upper surface; and a chip breaker formed on the upper surface between the first ridgeline and the second ridgeline.

In addition, a nose portion connected to the second ridgeline, a first cutting edge connected to the nose portion, and a second cutting edge connected to the first cutting edge, are formed on the first ridgeline.

Further, the chip breaker has a wall surface including a first wall surface that is formed along the first ridgeline, and a reinforcing surface that is connected to the first wall surface and the first end surface at an end portion of the chip breaker on a side of the first cutting edge, and that forms an angle of 90 degrees or an obtuse angle with the first end surface.

Herein, the feature, in which the angle formed by the reinforcing surface and the first end surface is 90 degrees or an obtuse angle, denotes that the angle formed by the surface of the reinforcing surface and the first end surface is 90 degrees or an obtuse angle.

The surface facing a predetermined direction such as the flank facing the first direction is not limited to the surface in the case where the direction of the normal to the surface matches the predetermined direction, and includes the surface in the case where the surface is inclined and forms an acute angle.

The top surface of the chip breaker may be flat or curved, and the top surface thereof is discontinuously connected to the first wall surface and the reinforcing surface of the wall surface of the chip breaker.

On the other hand, the first wall surface and the reinforcing surface are preferably connected to each other continuously and smoothly and, for example, the reinforcing surface may be provided with a fillet surface and connected to the first wall surface.

In addition, the feature, in which the angle formed with the first direction increases as the distance from the first end surface increases, is not limited to the case where the angle formed with the first direction monotonously increases as the distance from the first end surface increases, and includes the case where the angle increases stepwise on a per predetermined portion basis.

BRIEF DESCRIPTION OF DRAWINGS

FIG. 2A is a plan view of the cutting tool 10 and FIG. 2B is a front view thereof;

DETAILED DESCRIPTION

First Embodiment

Figure 1A:
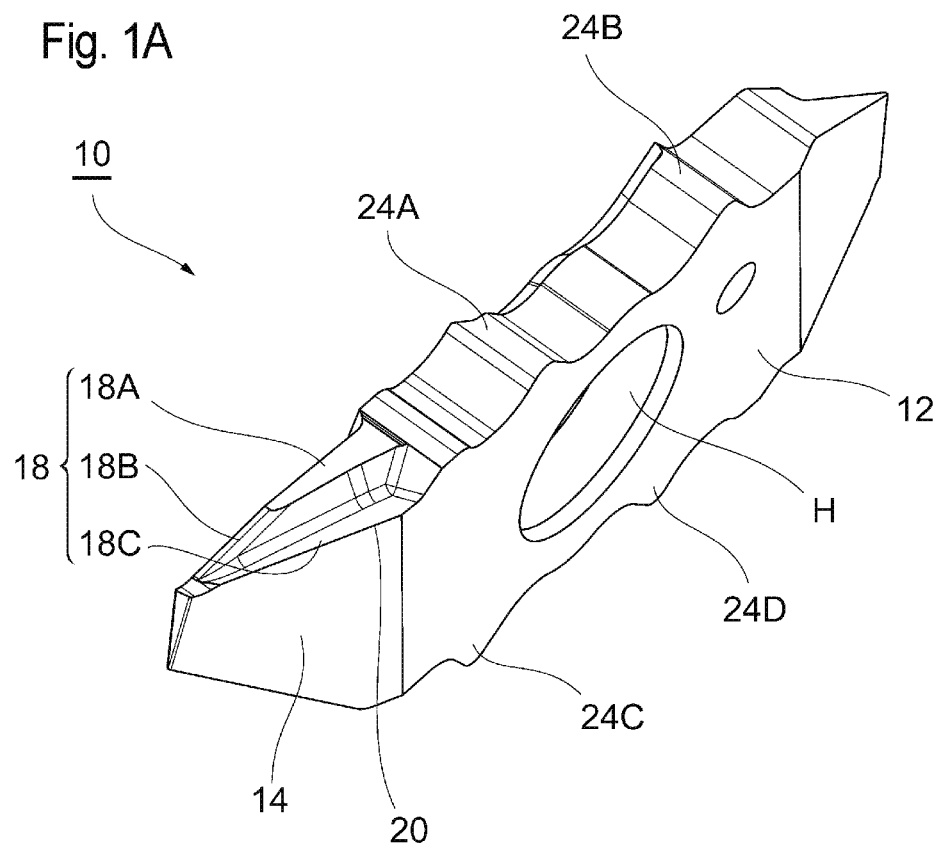
FIG. 1A is a perspective view of a cutting tool 10 and FIG. 1B is a right side view thereof.

Hereinbelow, an embodiment of the present invention will be described in detail with reference to the drawings. Note that the same elements are designated by the same reference numerals, and the duplicate description thereof will be omitted. In addition, the following embodiment is an example for describing the present invention, and the present invention is not limited only to the embodiment. Further, the present invention can be variously modified without departing from the gist thereof.

Figure 1B:
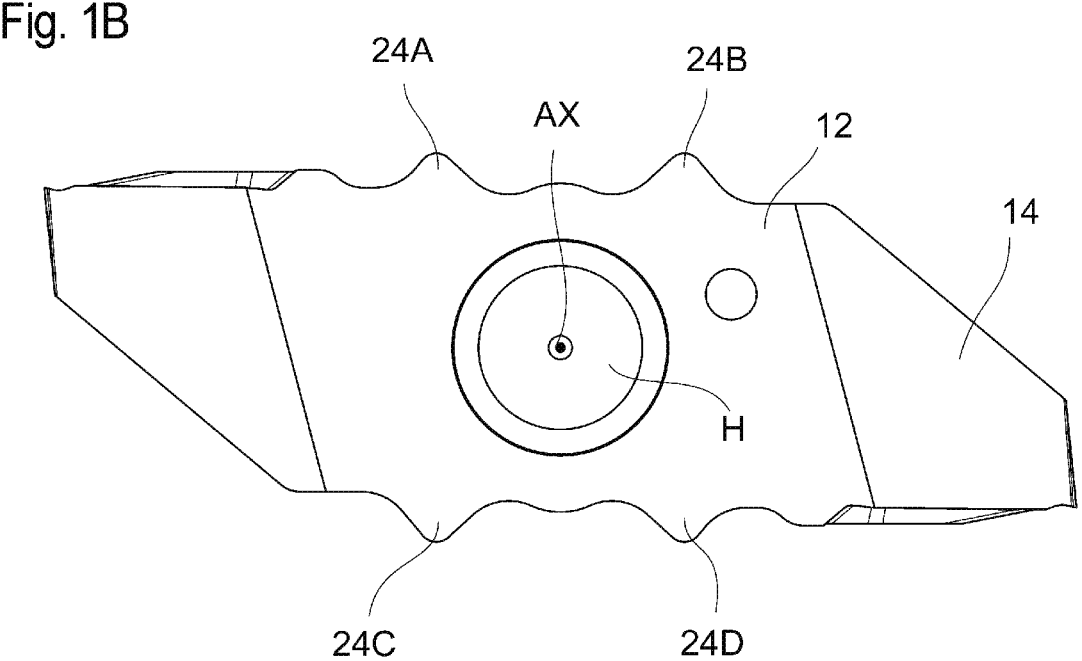

FIG. 1A is a perspective view of a cutting tool 10 for back turning according to the present embodiment. FIG. 1B is a right side view of the cutting tool 10. FIG. 2A is a plan view of the cutting tool 10, and FIG. 2B is a front view of the cutting tool 10.

As shown in FIGS. 1A and 1B, the cutting tool 10 includes an end surface 12 ("second end surface") formed of a flat surface, and an end surface 16 ("first end surface", FIG. 2A) that is parallel to the second end surface 12 and faces the side opposite to the second end surface 12. A through hole H through which a clamp screw for fixing the cutting tool 10 to a cutter passes is formed in the central portion of the second end surface 12. During back turning, the cutting tool 10 is caused to cut into a workpiece W by moving the cutting tool 10 relative to the workpiece W in a direction perpendicular to the central axis of the through hole H, and back turning of the workpiece W is performed by moving the cutting tool 10 in an axial feed direction AX ("first direction") that is a direction parallel to the central axis and facing the side of the second end surface 12. At this point, the end surface 16 opposes a flange back surface of the workpiece W, i.e., among surfaces of a stepped portion called a flange formed in the workpiece W having been subjected to back turning, a surface facing the axial feed direction AX.

In addition, the cutting tool 10 includes a flank 14 that is connected to the second end surface 12 and the end surface 16, and faces the axial feed direction AX. The flank 14 is inclined relative to the axial feed direction AX, and includes a flat surface portion that forms an obtuse angle with the second end surface 12 and forms an acute angle with the end surface 16.

Additionally, the cutting tool 10 includes an upper surface 18 that is connected to the flank 14, the end surface 16, and the second end surface 12, and includes a rake face 18C. The upper surface 18 faces a direction perpendicular to the axial feed direction AX.

Further, the cutting tool 10 includes a ridgeline 20 ("first ridgeline") that connects the upper surface 18 and the flank 14, and a ridgeline 22 ("second ridgeline") that connects the upper surface 18 and the end surface 16.

The ridgeline 20 is provided with a nose portion 20A connected to the ridgeline 22, a front cutting edge 20B ("first cutting edge") connected to the nose portion 20A, and a main cutting edge 20C connected to the front cutting edge 20B.

On the other hand, the cutting edge is not formed in the ridgeline 22 (FIG. 2A).

FIG. 2A is a plan view of the cutting tool 10 when viewed from the side of the upper surface 18. As shown in the drawing, the first ridgeline 20 is configured such that an angle formed with the axial feed direction AX increases stepwise as a distance between the portion of the first ridgeline 20 and the end surface 16 increases. A portion in which the front cutting edge 20B is formed is substantially parallel to the axial feed direction AX but is slightly inclined relative to the axial feed direction AX, while the main cutting edge 20C is sharply inclined relative to the axial feed direction AX. In addition, as shown in the drawing, the front cutting edge 20B and the main cutting edge 20C can be configured to be substantially linear or form a straight line when viewed from the side of the upper surface 18.

Further, as shown in FIG. 2A, a chip breaker is formed in an area of the upper surface 18 between the ridgeline 20 and the ridgeline 22. The chip breaker includes a chip breaker top surface 18A, a chip breaker wall surface 18B that is connected to the chip breaker top surface 18A and includes a surface facing the axial feed direction, and the rake face 18C that is connected to the chip breaker wall surface 18B and is provided between the chip breaker wall surface 18B and the ridgeline 20. The chip breaker top surface 18A may be configured by using a flat surface facing a direction substantially perpendicular to the axial feed direction AX, or may also be formed into a curved surface. Alternatively, the chip breaker top surface 18A may be configured such that the top portion is formed into a ridgeline or point instead of using the flat surface or curved surface. The shape of the chip breaker wall surface 18B will be described in detail later by using FIG. 3 and, as shown in FIG. 2A, the chip breaker wall surface 18B is inclined relative to the axial feed direction AX along the main cutting edge 20C, and is configured such that a distance to the main cutting edge 20C when viewed from the side of the upper surface 18 decreases with approach to the front cutting edge 20B. The rake face 18C may include a flat surface portion connected to the ridgeline 20, or may also be depressed such that a distance to the chip breaker top surface 18A increases, and connected to the wall surface 18B.

In addition, as shown in FIGS. 1A and 1B, in a portion of the upper surface 18 that connects the second end surface 12 and the end surface 16, two convex portions 24A and 24B that protrude in the direction perpendicular to the axial feed direction AX are provided. In addition, two convex portions 24C and 24D that protrude in the direction perpendicular to the axial feed direction AX are provided at positions that are axially symmetric about the through hole H of the cutting tool 10. As will be described later, during back turning, the cutting tool 10 is fixed to the cutter 30 by bringing a holding portion H1 and a holding portion H2 of the cutter 30 (FIG. 4) into contact with an area between the convex portions 24A and 24B and an area between the convex portions 24C and 24D.

Figure 3:
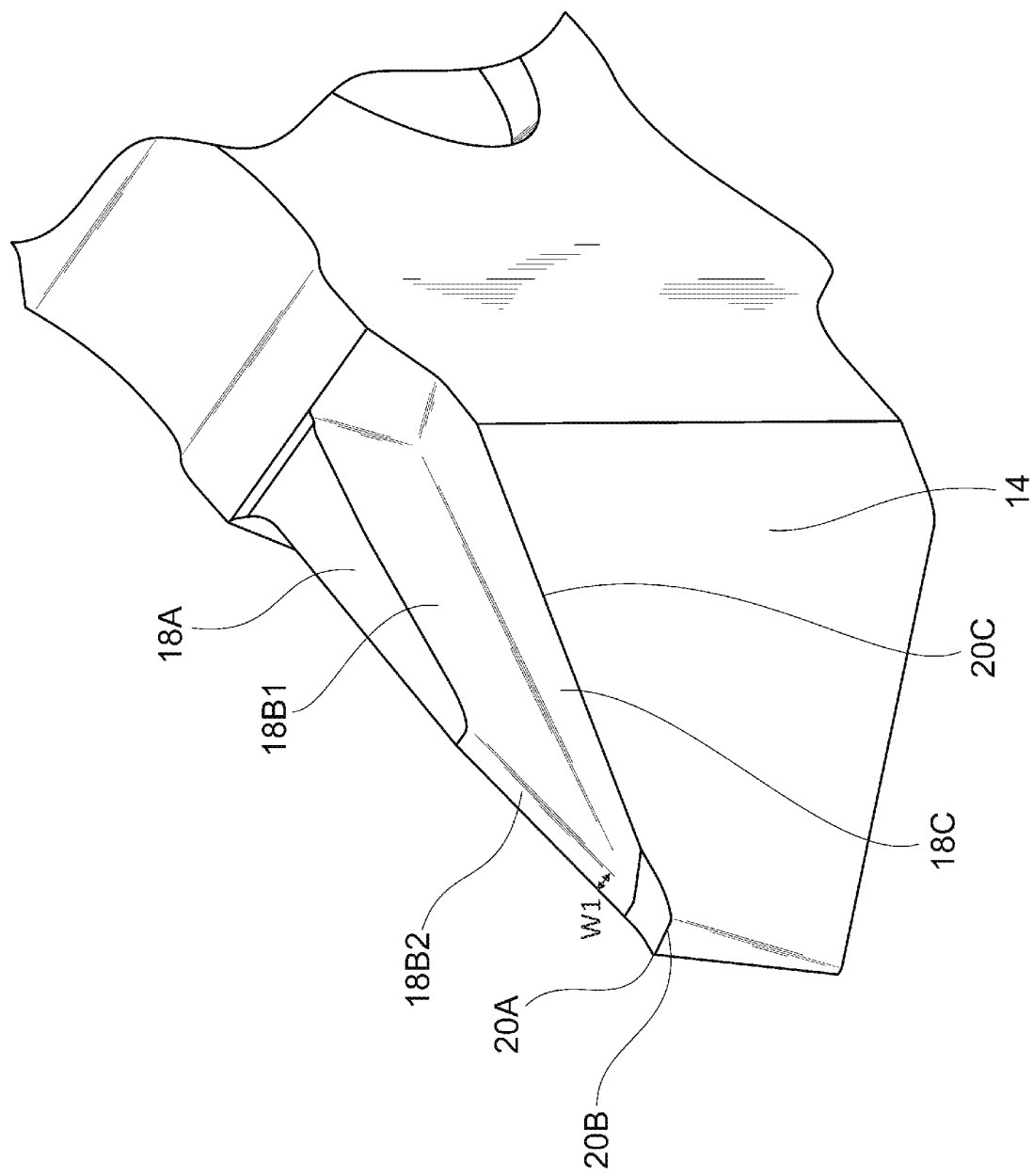
FIG. 3 is a perspective view of a tip portion of the cutting tool 10.

FIG. 3 is a perspective view of a tip portion of the cutting tool 10. As shown in the drawing, the chip breaker wall surface 18B includes a first wall surface 18B1 ("first wall surface") that is formed along the main cutting edge 20C so as to approach the main cutting edge 20C with approach to the front cutting edge 20B, and a reinforcing surface 18B2 that is connected to the first wall surface 18B1 and the end surface 16 at an end portion close to the front cutting edge 20B.

The reinforcing surface 18B2 is connected to the end surface 16 perpendicularly to the end surface 16, and includes a flat surface substantially parallel to the axial feed direction AX in a portion connected to the end surface 16. On the other hand, the reinforcing surface 18B2 is continuously connected to the first wall surface 18B1, and has a rounded fillet surface formed in a portion connected to the first wall surface 18B1.

In addition, the width W1 of the reinforcing surface 18B2 when viewed from the side of the upper surface 18 can be configured to be, e.g., not less than one-third of the length of the front cutting edge 20B, and the reinforcing surface 18B2 preferably has a width W1 of not less than half of the length of the front cutting edge 20B.

The rake face 18C between the ridgeline 20 and the chip breaker wall surface 18B has a flat portion that is substantially flat. The first wall surface 18B1 is connected to the rake face 18C at an inclination of about 45 degrees from the flat portion, while the reinforcing surface 18B2 is connected to the rake face 18C at a gentle inclination (e.g., an inclination of 30 degrees) from the flat portion. Note that, when viewed from the side of the upper surface 18, a ridgeline connecting the first wall surface 18B1 and the chip breaker top surface 18A is substantially linear.

The cutting tool 10 is formed to be axially symmetric about the through hole H, and the cutting edges and the chip breaker having the same shapes are formed at the other end of the cutting tool 10.

Figure 4A:
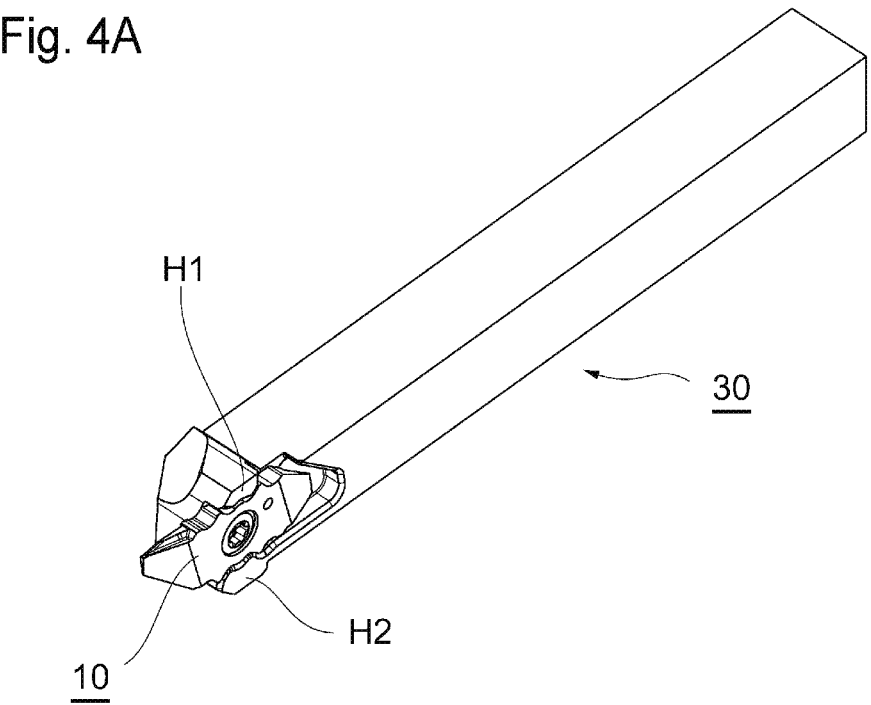
FIGS. 4A and 4B are views showing the cutting tool 10 and a cutter 30.
Figure 4B:
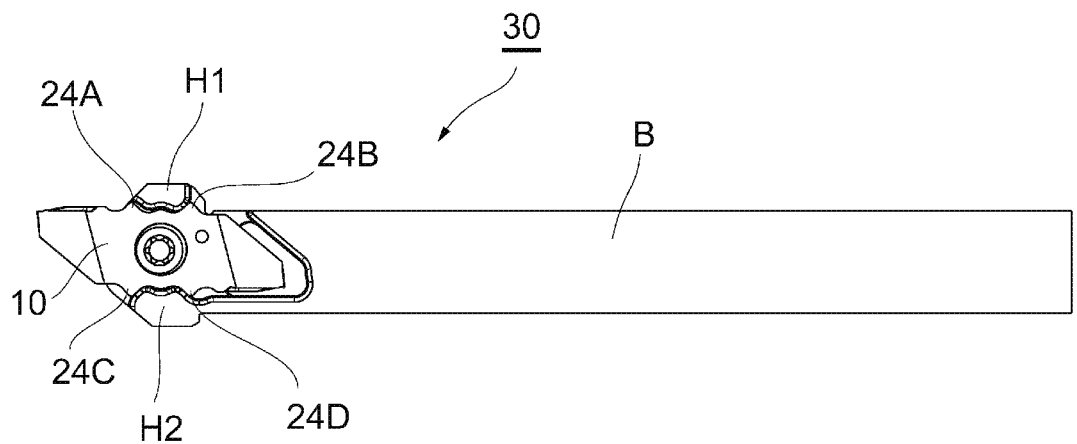

FIG. 4A is a perspective view of the cutter 30 to which the cutting tool 10 is fixed, and FIG. 4B is a right side view of the cutter 30.

As shown in the drawings, the cutter 30 includes a body B and the two holding portions H1 and H2, and the cutting tool 10 is fixed by bringing the holding portion H1 into contact with the area between the convex portion 24A and the convex portion 24B, bringing the holding portion H2 into contact with the area between the convex portion 24C and the convex portion 24D, and engaging the clamp screw passing through the through hole H with a screw portion provided in the cutter 30.

In the case where back turning is performed by using the cutting tool 10 described above, first, the cutting tool 10 is caused to cut into the workpiece W by moving the workpiece W in the direction perpendicular to the axial feed direction AX by using the front cutting edge 20B that is the tip side of the cutting tool 10 and, thereafter, the workpiece W is machined by turning the workpiece W in the axial feed direction AX by using mainly the main cutting edge 20C. In particular, when the cutting tool 10 is caused to cut into the workpiece W by using the front cutting edge 20B on the tip side, chips come out substantially perpendicularly from the front cutting edge 20B, and tend to collide with the tip of the chip breaker wall surface.

However, the cutting tool 10 is provided with the reinforcing surface 18B2, and hence it is possible to improve chipping resistance. Note that the reinforcing surface portion 18B2 may be connected to the end surface 16 so as to form an obtuse angle with the end surface 16.

In the case where the chip breaker is formed by polishing that uses a grindstone, when the chip breaker is formed into a shape having a reinforcing surface such as a chamfer, cost is increased. Consequently, the use of the above shape is often avoided. However, in the cutting tool 10, it is possible to inexpensively provide the reinforcing surface portion 18B2 that functions as the reinforcing surface by providing a shape in a mold and forming the wall surface side of the chip breaker by pressing and sintering. Note that, in the cutting tool 10 of this embodiment, the direction of the central axis of the through hole H is different from the direction faced by the upper surface 18 having the chip breaker. Consequently, it is not possible to simultaneously mold the chip breaker shape and the through hole H by press molding with a normal mold. Examples of a method capable of simultaneously molding the chip breaker shape and the through hole H include the following two molding methods. One of the molding methods is the method in which the through hole H is disposed in a normal pressing direction, and the chip breaker shape is molded by press molding with a horizontal punch that laterally operates so as to intersect the pressing direction. The other method is the method in which the chip breaker shape is disposed in the normal pressing direction, and the through hole H is molded by press molding with the horizontal punch that laterally operates so as to intersect the pressing direction. In both of the methods, it becomes possible to simultaneously mold the chip breaker shape and the through hole H by press molding by using the special mold that includes the horizontal punch or the like instead of using the normal mold.

In the present embodiment, the flank and part of the rake face (only the portion in the vicinity of the tip) of the cutting tool 10 are formed by polishing, but the entire shape of the tool may be formed only by pressing and sintering instead of using the polishing.

What is claimed is:

1. A cutting tool for back turning comprising:
    a flank facing a first direction;
    a first end surface facing a direction opposite to the first direction;
    an upper surface connecting the flank and the first end surface;
    a first ridgeline connecting the flank and the upper surface such that an angle between the first ridgeline and the first direction increases as a distance from the first end surface to a portion of the first ridgeline in the first direction increases when viewed from a side of the upper surface;
    a second ridgeline connecting the first end surface and the upper surface; and
    a chip breaker formed on the upper surface between the first ridgeline and the second ridgeline, wherein
    the first end surface is connected to the flank at one end of the first ridgeline and at one end of the second ridgeline,
    the first ridgeline has a nose portion connected to the second ridgeline at the one end of the first ridgeline, a first cutting edge connected to the nose portion, and a second cutting edge connected to the first cutting edge,
    the chip breaker has a wall surface including a first wall surface that extends along the first ridgeline, and a reinforcing surface that is connected to the first wall surface and the first end surface at an end portion of the chip breaker on a side of the first cutting edge,
    an angle of 90 degrees or an obtuse angle is formed between the reinforcing surface and the first end surface,
    a rake face is formed on the upper surface between the chip breaker and the first ridgeline, and
    the reinforcing surface is connected to the rake face while maintaining a width of the reinforcing surface between the first end surface and the first wall surface to be not less than one-third of a length of the first cutting edge.

2. The cutting tool for back turning according to claim 1, wherein
    the reinforcing surface is flat at least in a portion connected to the first end surface.

3. The cutting tool for back turning according to claim 1, wherein
    the first wall surface and the reinforcing surface are smoothly connected to each other.

4. The cutting tool for back turning according to claim 1, wherein
    a flat portion is formed in the rake face between the chip breaker and the first ridgeline, and an inclination of the first wall surface relative to the flat portion is larger than an inclination of the reinforcing surface relative to the flat portion.

5. A cutter comprising the cutting tool for back turning according to claim 1.

* * * * *